(12) United States Patent
Kuroda et al.

(10) Patent No.: US 6,280,074 B1
(45) Date of Patent: Aug. 28, 2001

(54) CONTINUOUS MIXER

(75) Inventors: Yoshinori Kuroda; Hiroshi Ueda; Masahiko Kashiwa; Shoji Yasuda; Shin Hotani; Yoshimitsu Tanaka, all of Takasago (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 09/706,733

(22) Filed: Nov. 7, 2000

(30) Foreign Application Priority Data

Nov. 8, 1999 (JP) .................................................. 11-317129

(51) Int. Cl.$^7$ .............................. B28C 7/10; B01F 15/02; B29B 7/38
(52) U.S. Cl. ...................... 366/76.3; 366/76.93; 366/80; 366/83; 425/207
(58) Field of Search .................................. 366/76.1, 76.3, 366/76.4, 76.6, 76.93, 80, 81, 82, 83, 84, 85; 425/207, 205, 208, 209

(56) References Cited

U.S. PATENT DOCUMENTS

| | | | |
|---|---|---|---|
| 4,029,300 | * | 6/1977 | Morishima et al. .................... 366/84 |
| 4,054,271 | * | 10/1977 | Lanzillo .................................. 366/85 |
| 5,141,426 | * | 8/1992 | Capelle .................................. 366/80 |
| 5,283,021 | * | 2/1994 | Shih . |
| 5,297,865 | * | 3/1994 | Engel et al. ............................ 366/84 |
| 5,332,308 | * | 7/1994 | Scheuring ............................... 366/85 |
| 5,490,725 | * | 2/1996 | Behrens et al. ........................ 366/82 |
| 5,672,005 | * | 9/1997 | Fuki et al. .............................. 366/82 |
| 5,749,649 | * | 5/1998 | Schobert-Csongor et al. ..... 366/76.4 |

FOREIGN PATENT DOCUMENTS 4-74608 * 3/1992 (JP) ..................................... 366/76.4

* cited by examiner

*Primary Examiner*—Tony G. Soohoo
(74) *Attorney, Agent, or Firm*—Oblon, Spivak, McClelland, Maier & Neustadt, P.C.

(57) ABSTRACT

A continuous mixer in which a pair of left and right rotors 4 are rotatably inserted into a chamber 2 having a feed port 13 and a discharge port 14 for materials at both axial ends, respectively, a gate device 17 for adjusting the polymer flow resistance of the materials is provided halfway in the axial direction of the chamber 2, and a first and a second mixing portions 19, 21 are formed at portions, respectively, of the rotors 4 positioned upstream and downstream of the gate device 17, wherein a forced feed means 23 for forcibly post-adding the materials is connected to a portion downstream of the gate device 17 in the chamber 2 and upstream of the discharge port 15.

9 Claims, 5 Drawing Sheets

CONTINUOUS MIXER

BACKGROUND OF THE INVENTION

1. Field of the Invention

The present invention is related to a continuous mixer for mixing polymer materials such as plastics, rubber and the like.

2. Description of the Related Art

The above-described continuous mixer is normally designed so that strong shearing working is applied to materials to be mixed such as plastics, rubber and the like by rotors which rotate at a high speed in a counter rotation to plasticize, melt and mix them. A variety of fillers and additives are efficiently mixed into the plasticized and molten resins to mix and disperse them, thereby capable of making resin products of various qualities. Particularly, the continuous mixer of a center construction in which both axial ends of rotors are supported by bearings has the characteristics that the rotors are not deflected nor contacted with a chamber, thereby capable of rotating the rotors at high speed, and capable of easily constituting mixing and pelletizing equipment having the high production ability.

Out of such center support type continuous mixer, there is a two-shaft mixing apparatus having a twin-rotor and of a two-stage mixing type which is particularly suitable for tough mixing, which mixer comprises a pair of left and right rotors rotatably inserted, in the state of supporting axial both ends, into a chamber having a feed port and a compound discharge port on the axial both ends. The rotor for the two-stage mixing type continuous mixer as described above is formed with a first feed portion for carrying the mix from the feed port to the downstream, a first mixing portion for the compound materials carrying to the downstream by the first feed portion, a second feed portion for carrying the compound materials which was mixed by the first mixing portion, and a second mixing portion for further mixing the compound materials carrying to the downstream by the second feed portion, and in the halfway in the axial direction of the chamber, there is provided a gate device for controlling a mixing strength on the compound materials.

According to the two-stage mixing type continuous mixer, since a polymer flow resistance of the compound materials can be adjusted by the gate device provided in the halfway in the axial direction of the chamber, the mixing strength on the compound materials in the first and second mixing portions can be uniformed, thereby providing the advantage that the sufficient mixing time can be secured without excessively raising the temperature of the compound materials.

Further, according to the conventional two-stage mixing type continuous mixer as described above, volatile gases can be exhausted from a vent port provided immediate downstream of the gate device to thereby keep the better quality of the products, and the compound materials such as fillers can be added later from the vent port to thereby also accomplish the adjustment of the filling concentration thereof and the blend adjustment of the final products. However, in the conventional two-stage mixing type continuous mixer, from a viewpoint that the vent port mainly has a function as an exhaust port for volatile gases, the post-addition of the materials from the vent port is merely accomplished exclusively by a gravity drop of materials. However, problems which the post-addition of the materials can not be performed, takes place sometimes due to gases blowing back from the vent port.

That is, in the mixer of this kind, the compound materials as well as gases contained therein are introduced into the chamber from the first feed port, and the gases first introduced are blown back from the vent port to outside of the chamber, thus making it very difficult to evenly and sufficiently post-add separate compounds from the vent port. Further, the quantity of the gases first introduced into the chamber increases in proportion to a feed rate and a free volume of the continuous mixer, and therefore, particularly in the case of a large-type continuous mixer to meet the demand of recent high productivity, the blowing back of materials from the vent port is severe, and with respect to the filler having small bulk density, there is present a problem that the post-addition from the vent port is rarely performed.

SUMMARY OF THE INVENTION

It is an object of the present invention to provide a continuous mixer, in which post-addition of materials can be positively accomplished whereby adjustment of a filler concentration of the compound and adjustment of blend of final products can be accomplished easily.

The present invention provides the continuous mixer formed with a first and a second mixing portions at rotor portions located upstream and downstream, respectively, of a gate device, in which a forced feed means for forcibly post-adding materials is connected to a portion downstream of the gate device in a chamber and upstream of an exhaust port.

According to this arrangement, since the materials can be forcibly post-added to the portion downstream of the gate device in the chamber and upstream of the exhaust port, the post-addition of the materials to the second mixing portion can be accomplished evenly and sufficiently, and the adjustment of a fillers concentration of the materials and the adjustment of final products can be accomplished easily. It is noted that for the forced feed means, there can be employed a screw feeder comprising a carrying cylinder connected vertically to the chamber and a feed screw rotatably inserted into the cylinder.

In the present invention, separately from the forced feed means, there is provided a vent port at a portion downstream of the gate device in the chamber and upstream of the exhaust port.

According to this arrangement, the post-addition of the materials becomes enabled while exhausting volatile gases from the vent port, and the adjustment of a filling concentration of the materials and the adjustment of final products can be accomplished easily while keeping the better quality of the products.

In the present invention, a mixing strength adjusting means for adjusting a mixing strength of the compound materials in the second mixing portion is provided at the exhaust port of the chamber or a portion down stream of the second mixing portion.

According to this arrangement, the mixing strength of the compound materials after completion of the post-addition from the forced feed means can be also adjusted adequately by the mixing strength adjusting means. It is noted that for the mixing strength adjusting means, there can be employed a gate device for adjusting the polymer flow resistance of the compound materials changing orifice position and varying the rotor speed.

DESCRIPTION OF THE PREFERRED EMBODIMENTS

Figure 1:
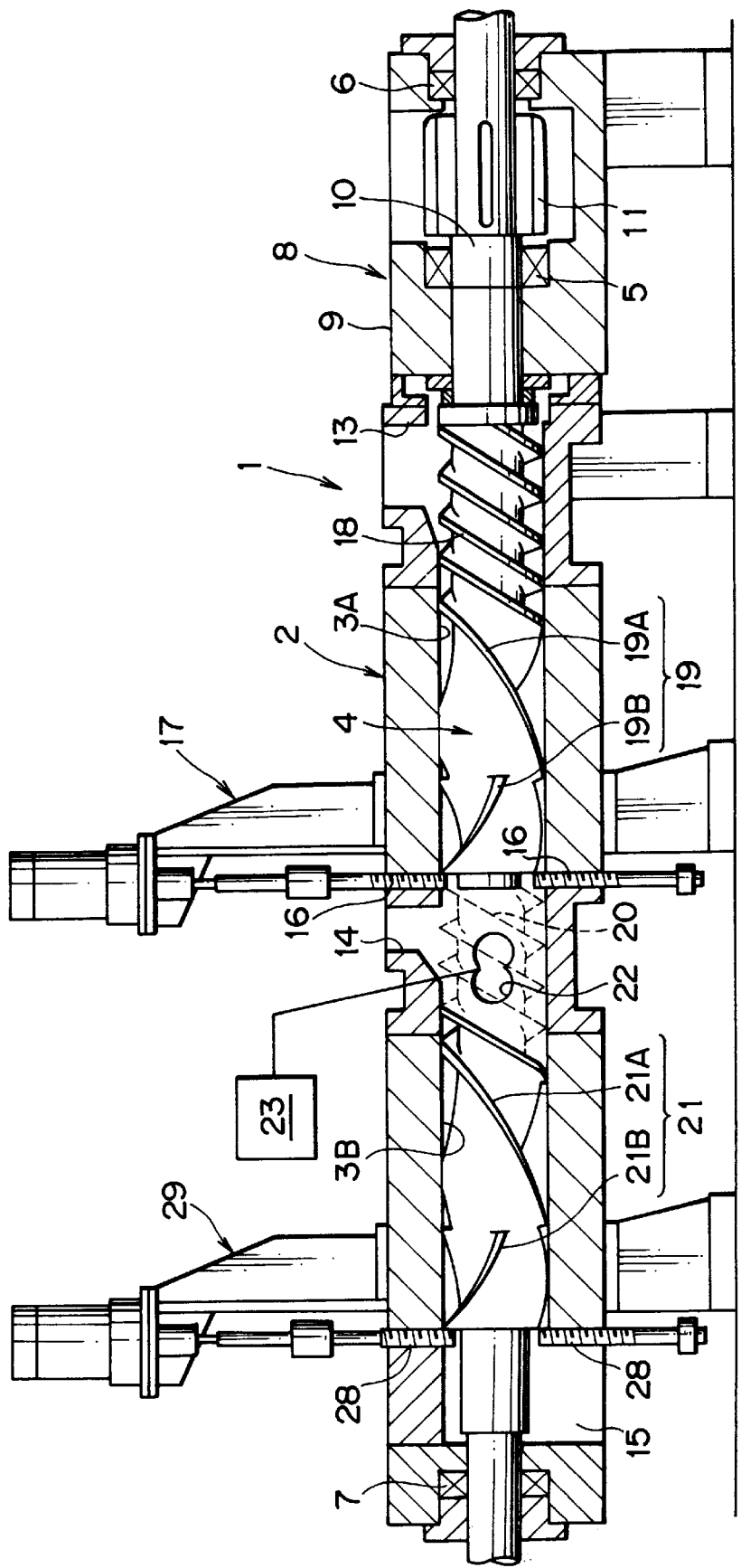
FIG. 1 is a side sectional view of a two-shaft continuous mixer according to a first embodiment of the present invention.
Figure 2:
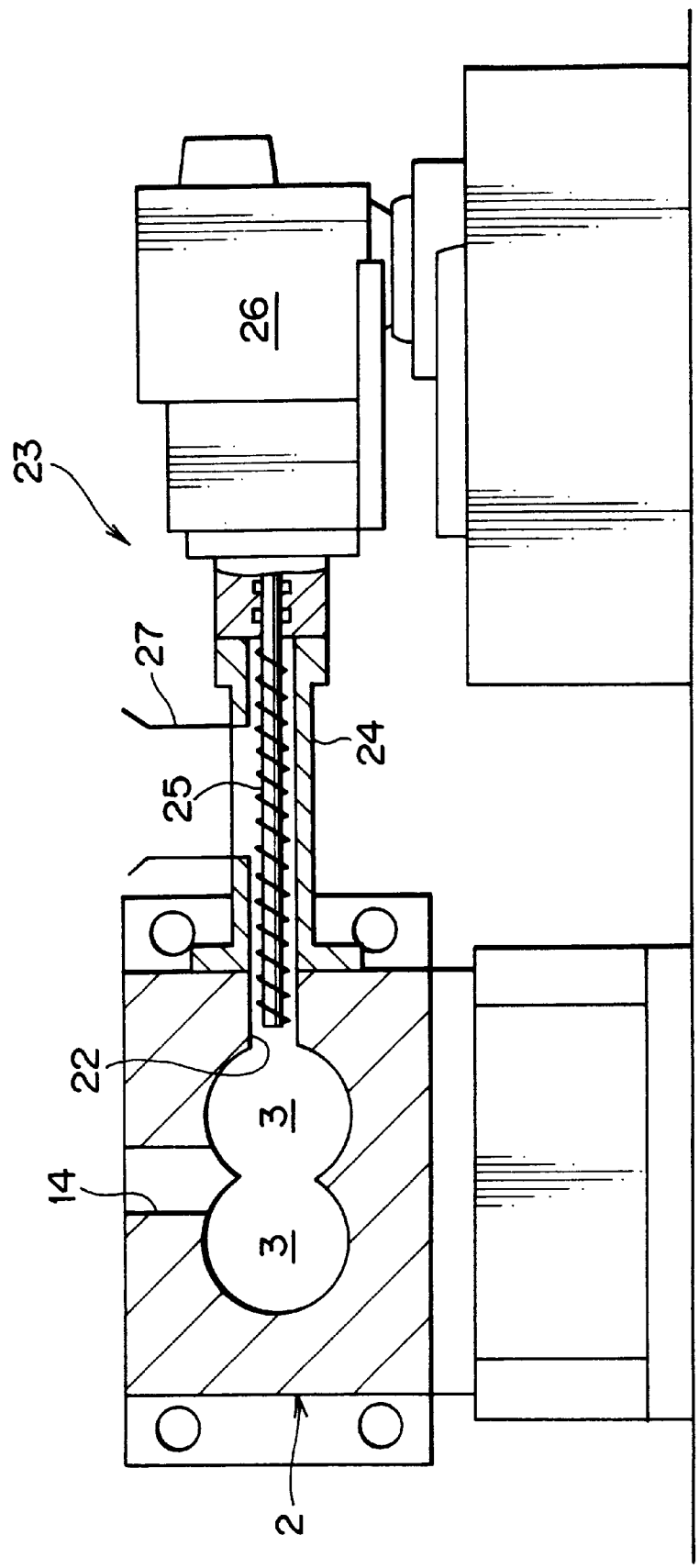
FIG. 2 is a cross-sectional view where the mixer shown in FIG. 1 is taken immediate downstream of a gate device.

The embodiments of the present invention will be described hereinafter with reference to the drawings. FIGS. 1 and 2 show a first embodiment of a two-shaft and two-stage mixing type continuous mixer employing the present invention. As shown in these figures, the two-shaft continuous mixer 1 according to the embodiment comprises a chamber 2 as the apparatus body, longitudinal substantially cylindrical two mixing chambers 3 are formed in communication with the chamber 2 in the shape of substantially glasses-hole as viewed in section.

Within each of the chambers 3 of the chamber 2 are inserted in parallel and rotatably a pair of left and right rotors 4, 4 which feed the compound materials from one side (upstream, on the right in FIG. 1) of the chamber 2 toward the other end (downstream, on the left in FIG. 1), and mix and melt the compound materials in the halfway thereof The rotors 4, 4, with their both ends in the direction of diametrically central part rotatably supported through bearings 5, 6, 7 arranged on both upstream and downstream of the chamber 2, are rotatively driven in a direction different from each other so that the opposed inner sides move from top to bottom.

The drive device for the rotors 4, 4 is connected to the upstream end of the chamber 2. The drive device 8 comprises a housing 9 which is connected in tandem to the upstream end of the chamber 2, a pair of front and rear bearings 5, 6 rotatably supporting an extended portion 10 of each rotor 4, 4 inserted into the housing 9, and a drive gear 11 secured to the middle portion in an axial direction of the extended portion 1. Out of the pair of rotors 4, 4, the extended portion 10 of one rotor 4 is projected further upstream of the housing 9, and the projected end thereof is connected to a motor (not shown) with a reduction unit. The drive gears 11 of the rotors 4, 4 are directly meshed with each other, because of which when one rotor 4 is rotatively driven by the motor, the other rotor 4 is rotated in a counter direction.

In the upper surface of the upstream end of the chamber 2 is provided a feed port 13 for supplying powdery or pellet-like materials to the chamber 3, and a hopper not shown is connected to the feed port 13. On the upper surface of the intermediate portion of the chamber 2 is formed a vent port 14 for degassing gases introduced when materials are supplied, and volatile gases generated during mixing from the mixing chamber 3. Further, on the downstream end of the chamber 2 is provided a discharge port 15 for discharging the molten and mixed materials outside the chamber 2. Further, in the half portion through the axis direction of the chamber 2 is provided an intermediate gate device 17 having a pair of upper and lower gate plates 16 close to or away from the diametrical outer side relative to the outer peripheral portion of the rotor 4. The gate device 17 is provided to adjust the polymer flow resistance on the materials by changing a gate plate position 16 with respect to the rotor 4, and the chamber 3 within the chamber 2 is divided into two mixing stages 3A and 3B lined in tandem upstream and downstream of the gate device 17.

As shown in FIGS. 1 and 2, the rotor 4 inserted into the first stage 3A upstream of the intermediate gate device 17 is formed on the outer peripheral surface thereof, in order from upstream, with a first feed portion 18 having a screw blade for feeding forward pellet or powdery compound materials from the feed port 13, and a first mixing portion 19 for applying the strong shearing force on the pellet or powdery compound materials to mix and melt compound materials. In the present embodiment, the first mixing portion 19 comprises a feed blade portion 19A twisted in the direction of extruding the compound materials downstream by rotation of the rotor 4, and a return blade portion 19B twisted in the direction of pushing back the compound materials to upstream by the rotation. In the rotor 4 of the present embodiment, the kneading blade and the screw blade employ a 3-blade type formed at intervals of 120 degrees in the peripheral direction. It is noted that for the kneading blade and the screw blade, there can be employed a 2-blade type, and the blade type formation, there can be employed to form at intervals from 90 degrees to 140 degrees in the peripheral direction.

On the other hand, the rotor 4 inserted into the second stage 3B downstream of the intermediate gate device 17 is formed on the outer peripheral surface thereof, in order from downstream, with a second feed portion 20 having a screw blade for forcibly carrying compound materials by the first mixing portion 19 toward the discharge port 15, and a second mixing portion 21 for further applying the shearing force on the compound materials to mix and melt. In the present embodiment, the second mixing portion 21 also comprises a feed blade portion 21A twisted in the direction of extruding the compound materials downstream by rotation of the rotor 4, and a return blade portion 21B twisted in the direction of pushing back the compound materials upstrearm by the rotation.

As shown in FIG. 1, in the two-shaft continuous mixer 1 according to the present embodiment, separately from the vent port 14, an intermediate feed port 22 opened sideways is formed in the side of a portion corresponding to the first feed portion 18 in the chamber 2, and a forced feed means 23 for forcibly post-adding the materials is connected to the intermediate feed port 22.

As shown in FIG. 2, the forced feed means 23 comprises a screw feeder comprising a carrying cylinder 24 arranged vertically and/or horizontally with respect to the chamber 2 and directly connected to the intermediate feed port 22 sideways, a pair of left and right feed screws 25 rotatably inserted into the cylinder 24, a motor 26 with a reduction unit for rotating and driving the screw 25, and a hopper 27 connected to an upper opening of the carrying cylinder 24.

Further, in the two-shaft continuous mixer 1 according to the present embodiment, a downstream gate device 29 having a pair of upper and lower gate plates 28 close to or away from, form the diametrical outside, from the outer peripheral portion of the rotor 4 is provided on the discharge port 13 of the downstream end of the chamber 2. This downstream gate device 29 is provided, similarly to the aforementioned intermediate gate device 17, to adjust the polymer flow resistance of the compound materials by changing a clearance of the gate plate 28 with respect to the rotor 4. Accordingly, in the case of the present embodiment, the mixing strength on the compound materials by the first mixing portion 19 of the rotor 4 is adjusted by the intermediate gate device 17, and the mixing strength on the compound materials by the second mixing portion 21 after the post-addition by the forced feed means 23 can be adjusted by the downstream gate device 29.

In mixing the compound materials by the two-shaft continuous mixer 1 according to the above-described constitution, first, powdery compound materials (that may contain inorganic fillers) are charged through the feed port 13. Then, the compound materials are, within the first stage 3A, fed downstream by the first feed portion 18, and when the compounds pass through the tip of the first mixing portion 19, dispersed by the great shearing force and are molten by self heat generation. Afterward, the molten compound materials move to the second feed portion 20 of the second stage 3B while the mixing strength is being adjusted by the intermediate gate device 17, conveyed to the second mixing portion 21 by the screw action of the feed portion 20, and further mixed while the mixing strength is being adjusted by the downstream gate device 29.

And, the compound materials re-mixed by the second mixing portion 21 are discharged outside the chamber 2 from the discharge port 15 passing through the downstream gate device 29, and fed to a single screw extruder for feeding the materials to a post-processing device (such as a pelletizer) not shown. A twin screw extruder and/or a gear pump can be applied for a pressurize equipment instead of the single screw extruder. And, in the present embodiment, since the forced feed means 23 is connected immediate downstream of the intermediate gate device 17 in the chamber 2, it is possible to evenly and positively post-adding the materials separately and fillers to the molten compound materials already by the first mixing portion 19, and to simply perform the adjustment of the filling concentration of the compound materials in the second mixing portion 21 and the blend adjustment of the final products.

Further, since in the present embodiment, the vent port 14 is formed separately from the forced feed means 23, the post-addition of the materials is also possible while exhausting volatile gases resulting from mixing from the vent port 14, and also possible to perform the adjustment of the filling concentration of the compound materials and the blend adjustment of the final products while keeping the better quality of products. Further, since the downstream gate device 29 having function as the mixing strength into the second mixing portion is provided at the discharge port 15, it is possible to adequately adjust also the mixing strength of the compound materials after the post-addition of the fillers or the like.

Figure 3:
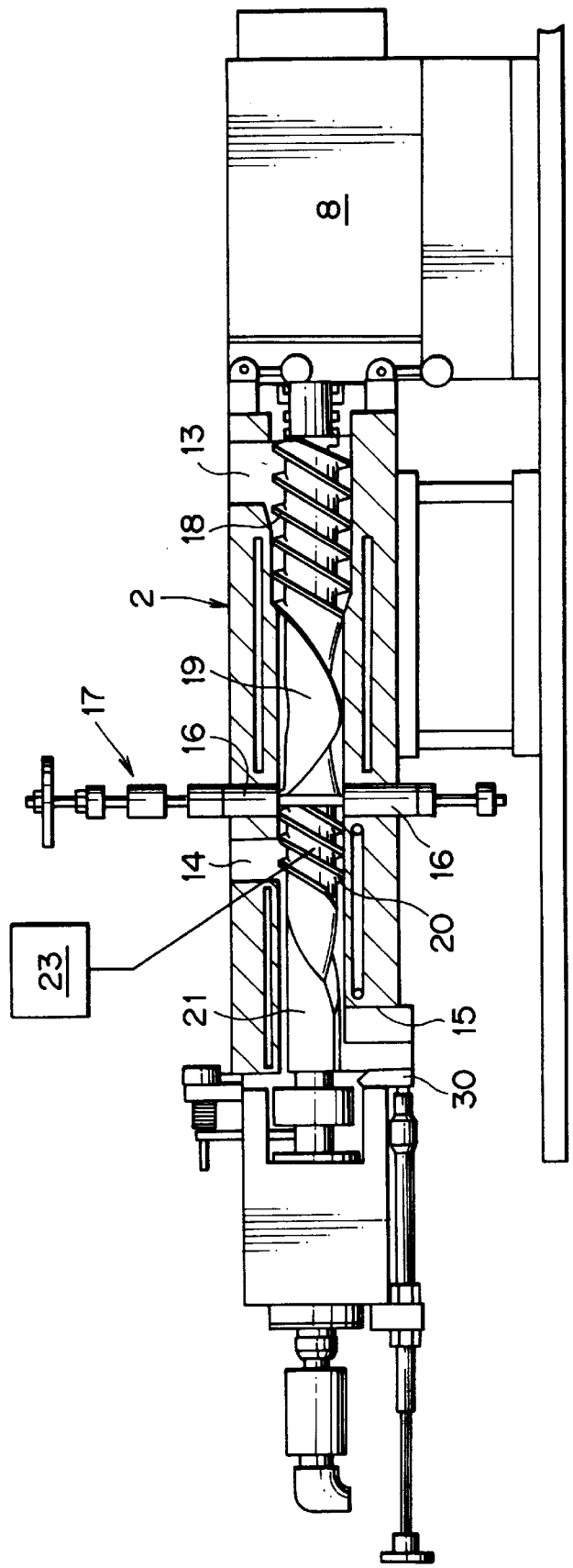
FIG. 3 is a side sectional view of a two-shaft continuous mixer according to a second embodiment of the present invention.
Figure 4:
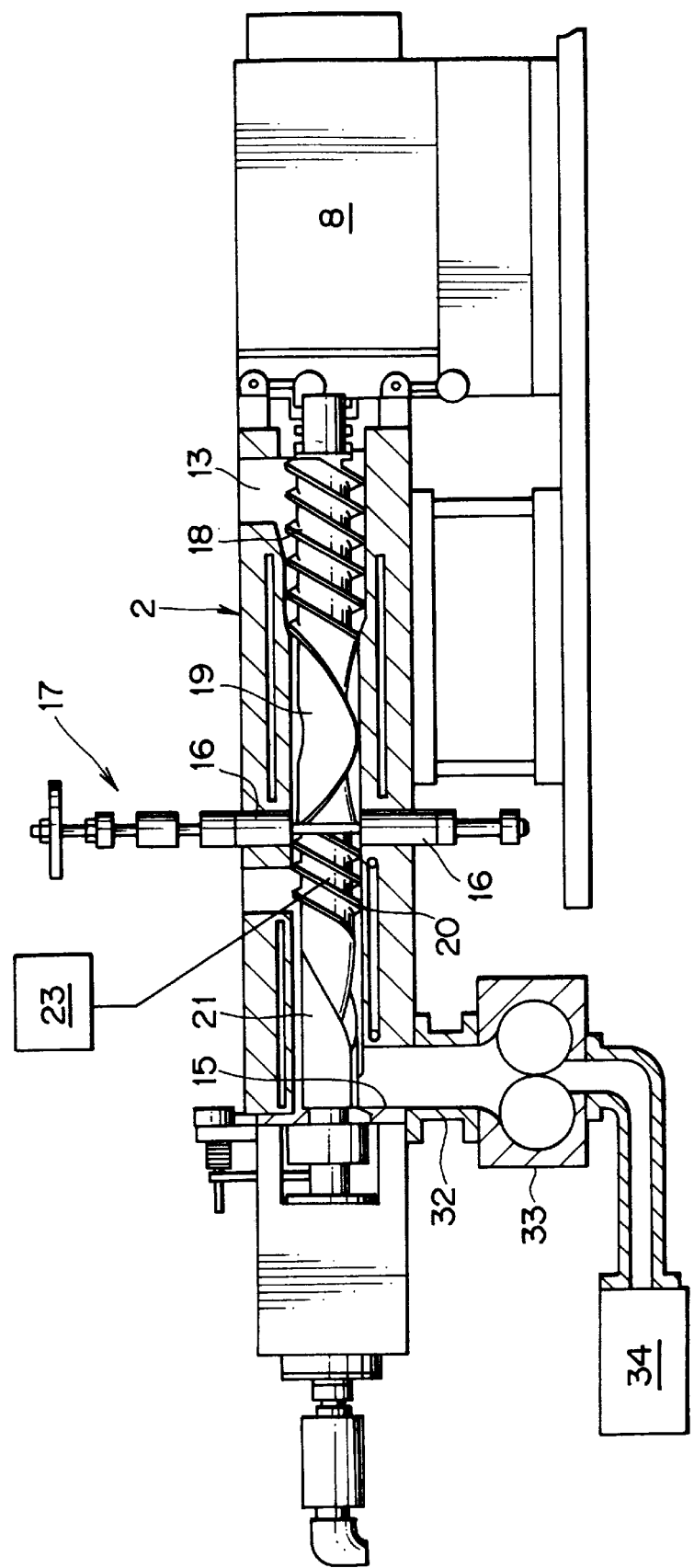
FIG. 4 is a side sectional view of a two-shaft continuous mixer according to a third embodiment of the present invention.

FIG. 3 shows the two-shaft continuous mixer 1 according to a second embodiment of the present invention. In this embodiment, as the means for adjusting the mixing strength by the second mixing portion 21, an open-close orifice 30 pivotally mounted on the discharge port 15 so as to be able to adjust an opening position is employed in place of the downstream gate device 29. It is noted that since other constitutions are similar to those shown in the first embodiment, the same parts are indicated by the same reference numerals, and the detailed description will be omitted. FIG. 4 shows the two-shaft continuous mixer 1 according to a third embodiment of the present invention. In this continuous mixer 1, a gear pump 33 is connected to the lower side of the discharge port 15 through a connecting pipe 32, and a pelletizer (a pelletizing device) and a post-processing device 34 are connected on the discharge side of the gear pump 33.

The gear pump 33 has not only function for changing the quantity of materials supplied to the post-processing device 34 by controlling rotating speed thereof, but function for changing the filling ratio of resins within the second stage 3B to adjust the mixing strength by the second mixing portion 21, because of which it has also function as a mixing strength adjusting on the compound materials in the second mixing portion 21.

Figure 5:
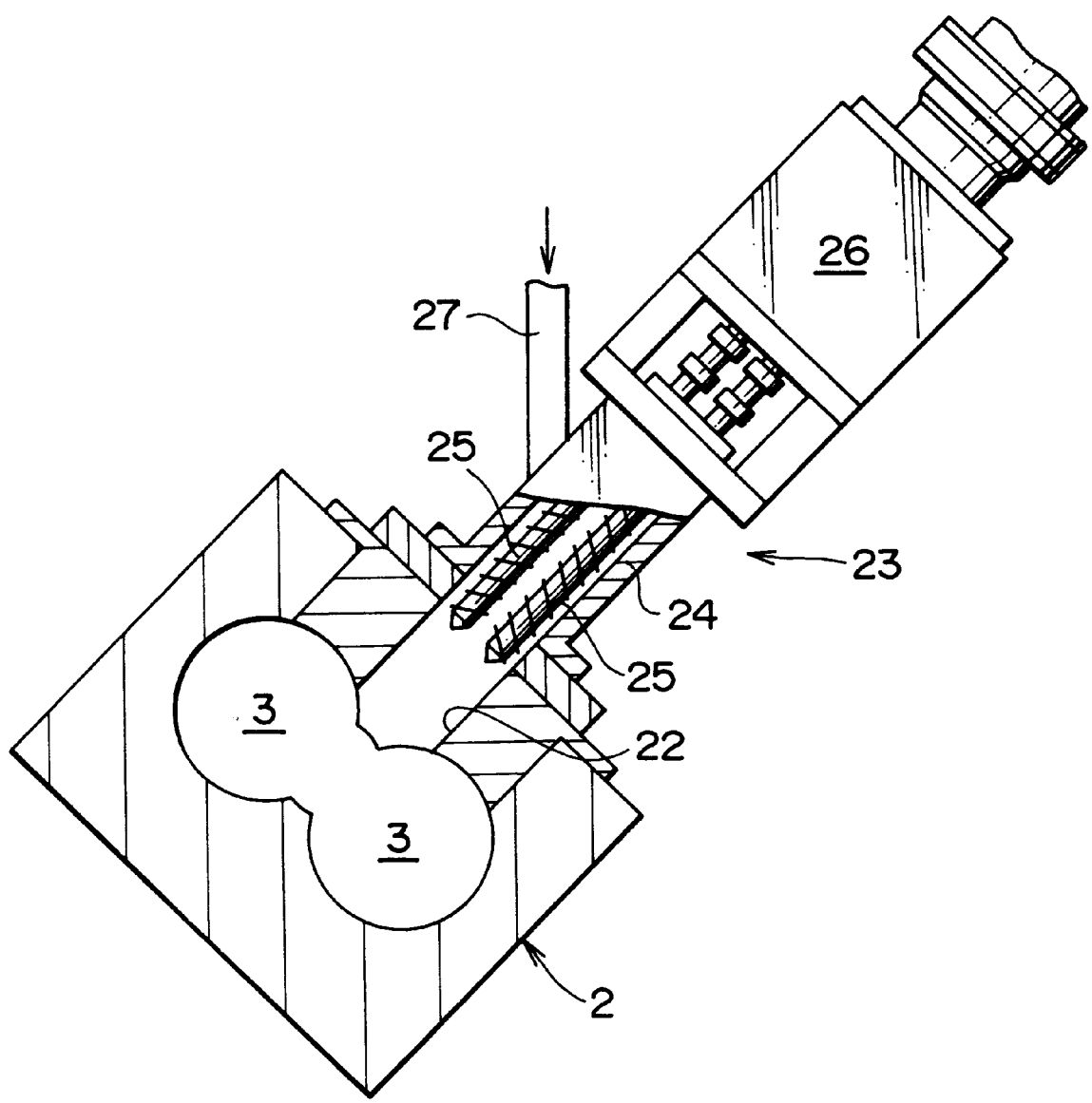
FIG. 5 is a cross-sectional view showing a modified form of a connecting construction of a screw feeder.

For example, the present invention may be employed also for the continuous mixer 1 of the type in which a cross section of the chamber 2 is inclined as shown in FIG. 5. In this case, the screw feeder as the forced feed means 23 is directly connected to the intermediate feed port 22 provided in the upper surface of the chamber 2. Alternatively, in the above-described embodiments, the vent port 14 is not provided but the screw feeder may be directly connected to the feed port 22 provided in the upper surface of the chamber 2. Further, the intermediate feed port 22 may be arranged downstream of the intermediate gate device 17 and upstream of the discharge port 15, but preferably, it is provided in a portion corresponding to the second feed portion 20 in the chamber 2 in order that the post-added materials are positively fed into the second mixing portion 21 to apply sufficient mixing work.

Next, embodiments (experimental examples) to prove the effects of the present invention will be explained. In this experiment, the 2-stage mixing type two-shaft continuous mixer 1 shown in FIG. 3 is used to actually mixed for the trial materials. The compound was obtained with following formulation. A: B: C=50 wt %: 50 wt %: 6 parts.

A High viscosity and high density polyethylene (HLMI= 0.15)

B Low viscosity and high density polyethylene (MI=50.0)

C Carbon master batch pellet (carbon concentration: 40%)

Since out of the materials A and B, the material B is somewhat smaller in density than the material A, when a mixture of the materials A and B is subjected to mixing and melting, the material B (low viscosity polyethylene) forms a matrix phase (a sea phase) of resin, and the material A (high viscosity polyethylene) forms a domain phase (an island phase) of resin. And, normally, where the viscosity of the matrix phase is low as compared to that of the domain phase, mixing is quite difficult.

Thus, the mixer shown in FIG. 3 of the present invention was used so that first, the compound materials having the ratio of A: B: C=50 wt %: 25 wt %: 6 parts were charged into the first feed port, and the remaining material B (25 wt % parts) was post-added from the forced feed means connected to the second stage. In this case, since in the initial compounding, the material A having the higher viscosity had the larger ratio than the material B having the low viscosity and higher viscosity material A became into the matrix phase, the adequate mixing could be accomplished in the first mixing stage. Further, the material B post-added from the forced feed means to the compound. As the compound mixture was higher viscosity than material B, material B was well mixed with the former compound, consequently, the sufficient compound mixture was obtained.

Thus, even the compound having the compounding that has been extremely difficult to mix together because of a large difference in viscosity, can be mixed by the post-addition with forced feed means using the mixing apparatus according to the present invention, whereby the compound extremely excellent in scattering property could be manufactured.

As described above, according to the present invention, since the post-addition of the materials with respect to the second mixing portion can be positively accomplished in the 2-stage mixing type two-shaft continuous mixer, the adjustment of the filling concentration of the materials and the blend adjustment of final products can be accomplished easily, thus enabling enhancement of the mixing processing ability.

We claim:

1. A continuous mixer, comprising:
   a feed port for compound materials;
   a discharge port for compounded mixture;
   a chamber having said feed port and said discharge port;
   a pair of left and right rotors rotatably inserted into said chamber;
   a gate device for adjusting the polymer flow resistance of the compound materials halfway in the axial direction of said chamber;
   a first mixing portion and a second mixing portion provided at portions of said rotors positioned upstream and downstream of said gate device; and
   a forced feed means for forcibly post-adding the materials at a portion downstream of said gate device in said chamber and upstream of said discharge port.

2. The continuous mixer according to claim 1, wherein a vent port is provided at a portion downstream of said gate device in said chamber and upstream of said discharge port.

3. The continuous mixer according to claim 1, wherein a mixing strength adjusting means for adjusting a mixing strength of the compound materials by the second mixing portion is provided at a portion down stream of the second mixing portion.

4. The continuous mixer according to claim 1, wherein a mixing strength adjusting means for adjusting a mixing strength of the compound materials by the second mixing portion is provided on said discharge port of said chamber.

5. The continuous mixer according to claim 1, wherein said forced feed means comprises a screw feeder.

6. The continuous mixer according to claim 3, wherein said mixing strength adjusting means adjusts the polymer flow resistance of the compound materials.

7. The continuous mixer according to claim 3, wherein said mixing strength adjusting means comprises a gear pump.

8. A two-shaft continuous mixer in which a pair of left and right rotors (4) are rotatably inserted into a chamber (2) having a feed port (13) and a discharge port (14) for compound materials at both axial ends, respectively, a gate device (17) for adjusting the polymer flow resistance of the compound materials is provided halfway in the axial direction of said chamber (2), and a first and a second mixing portions (19, 21) are formed at portions, respectively, of said rotors (4) positioned upstream and downstream of the gate device (17), characterized in that a forced feed means (23) for forcibly post-adding the materials is connected to a portion downstream of said gate device (17) in said chamber (2) and upstream of said discharge port (15).

9. A continuous mixer, comprising:
   a chamber;
   a rotor rotatably inserted into said chamber;
   a gate device for adjusting the polymer flow resistance of compound materials installed within said chamber; and
   a forced feed means for forcibly post-adding the materials to the downstream of said gate device in said chamber.

* * * * *